July 22, 1952 L. E. BORDER ET AL 2,604,384
APPARATUS FOR REGENERATING A FLUIDIZED CATALYST
Filed Oct. 31, 1949 2 SHEETS—SHEET 1
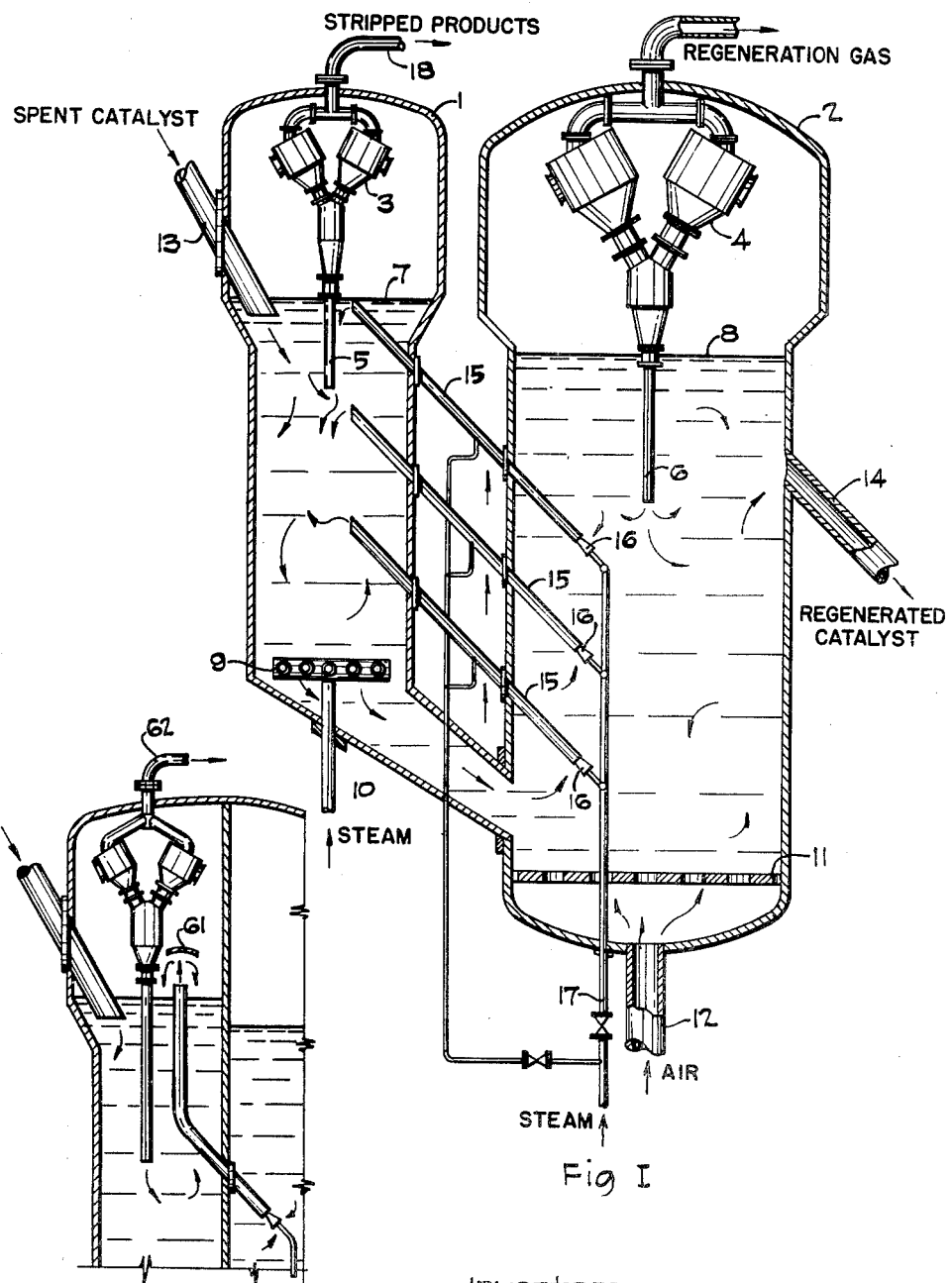
Fig. I
Fig. VI
Inventors:
Lawson E. Border
Richard P. Trainer
By C. J. Ott
their Attorney

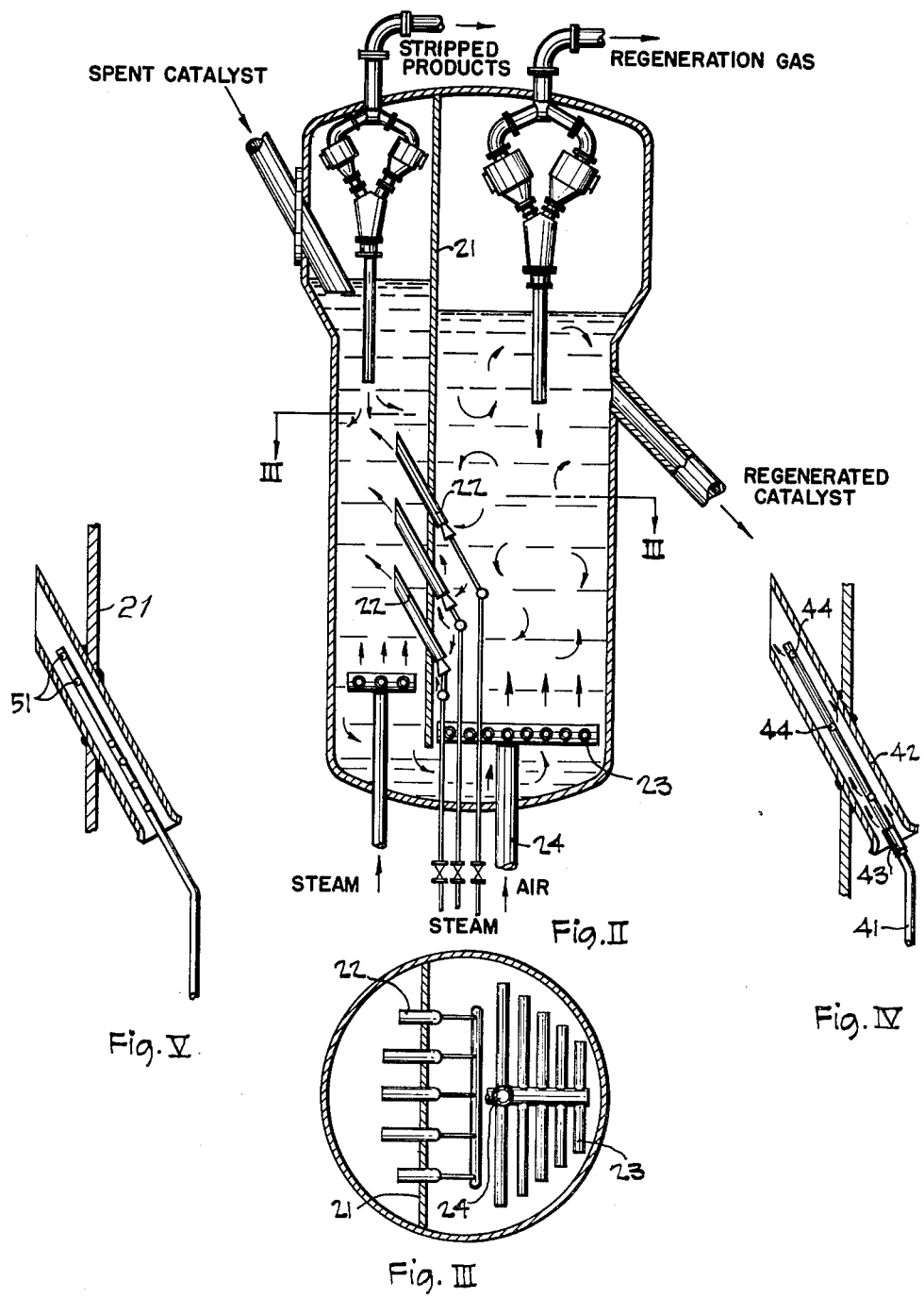

Patented July 22, 1952

2,604,384

UNITED STATES PATENT OFFICE 2,604,384

APPARATUS FOR REGENERATING A FLUIDIZED CATALYST

Lawson E. Border, Westwood, N. J., and Richard P. Trainer, Amityville, N. Y., assignors to Shell Development Company, San Francisco, Calif., a corporation of Delaware Application October 31, 1949, Serial No. 124,674

2 Claims. (Cl. 23—288)

This invention relates to an improved method and apparatus for the continuous regeneration of powdered catalyst and other similar solid contact material contaminated with carbonaceous deposits through the burning off of the carbonaceous matter with an oxygen-containing gas.

An object of the invention is to provide a method and apparatus for the regeneration of such contact agents in which the oxygen required to remove the carbonaceous deposits is materially decreased. A further object of the invention is to provide a method and apparatus which allow valuable products to be recovered from the contaminated solid. A further object of the invention is to provide a method and apparatus in which the regeneration may be carried out in a more convenient and practical manner on a large scale.

In the treatment of hydrocarbons or other corbonaceous materials in either the liquid phase or the vapor phase with finely divided solid contact materials, the contact material loses its efficiency due to contamination with carbonaceous deposits and therefore requires frequent regeneration. In practice the regeneration is effected by burning the carbonaceous matter under controlled conditions with an oxygen-containing gas such as oxygen, air, air diluted with flue gas, air fortified with oxygen, or a mixture of oxygen-containing gas and steam. The present invention relates to an improved method and apparatus for carrying out this regeneration in a more efficient and practical manner.

The process and apparatus of the invention are particularly adapted for the regeneration of the conventional microporous catalysts such as used in the catalytic cracking, catalytic reforming, hydroforming, polymerization, and refining of hydrocarbon oils. The process and apparatus are applicable, however, for the regeneration of other microporous (adsorptive) solid contact agents whether acting in the true catalytic sense or not, and regardless of the process in which they became contaminated with carbonaceous deposits. Thus, they are quite suitable for the regeneration of decolorizing clays and similar contact agents used in the treatment of vegetable oils, animal oils, chemical intermediates and the like. The contact agent should, however, be in a sufficiently finely divided state to be handled by the known fluidized solid technique. It is preferred that the majority of the particles of the solid pass through a standard (U. S.) 40-mesh sieve.

The contact agent at the end of a period of use contains appreciable amounts of the material treated, either in the liquid phase, the vapor phase, or both phases. This material is to a large extent occluded, i. e., it is present in the voids between the particles and in the pores of the particles. Prior to burning the carbonaceous material from the particles, it is the practice to replace such occluded material with a relatively inert material, and this step is commonly known as "stripping." In stripping, a relatively inert gas such as steam, flue gas, nitrogen, or the like is passed through a bed of the contact material to displace and remove most of the occluded carbonaceous matter. The resulting stripped material is then subjected to the burning treatment. In the burning treatment it is the practice to pass the oxygen-containing gas (commonly referred to as the regeneration gas) up through a bed of the contact material at a rate adjusted to maintain the finely divided solid in the so-called fluidized or pseudo liquid state. The maximum gas velocity which can be applied while still maintaining the pseudo liquid condition depends, as known, upon the density, shape, and fineness of the particles, but the velocity applied is usually in the order of one to two feet per second (calculated on the basis of the vessel without the fluidized solid present; i. e. superficial gas velocity). The operation can be carried out in either of two ways which may be designated "upflow" and "downflow," depending upon the type of regenerator used. In the upflow system the regenerated material is withdrawn from the regenerator overhead as a dilute suspension (dust cloud) in the spent regeneration gas and is subsequently recovered. In the downflow system the regenerated material is withdrawn as a dense, pseudo liquid, directly from the fluidized bed. The down flow type system is superior. The present invention relates particularly to this type of system.

In the process of this invention the operation is carried out in two separate zones which are in direct communication near their lower extremities in such a manner as to resemble a U. The finely divided solid is maintained in a pseudo liquid condition in both zones. The contaminated material from which the occluded carbonaceous material has preferably been previously removed, is introduced near the top of one zone and the regenerated material is withdrawn from near the top of the other zone. Gas is introduced into each zone near the bottom and the gases leaving the top of the fluidized bed in each zone are separately withdrawn. Aside from the flow of solid material from the bottom of the first zone to the bottom of the second zone there is maintained a circulation of solid material from the second zone to a higher point in the first zone. This circulation is effected by injection through inclined, restricted passages using a portion of the required gas for the purpose.

Having set forth the operation in general terms, the method and apparatus will be more particularly described in connection with the accompanying drawings wherein Figure I shows an elevation in cross section of an apparatus designed for operation according to the method of the invention.

Figure II shows an elevation in cross section of a modified apparatus also designed to operate according to the method of the invention.

Figure III shows a sectional plan of the apparatus illustrated in Figure II, the section being taken through III—III.

Figure IV shows the details of one modification of injector such as may be applied in the apparatus of Figures I, II and VI.

Figure V shows in cross section the details of a second modification of a gas injection tube such as may be substituted for that illustrated in Fig. IV.

Figure VI shows in cross section the pertinent part of an elevational view in cross section of an apparatus such as illustrated in Figure II modified through the use of extended injection tubes.

Referring to Figure I of the drawing, the apparatus comprises two cylindrical vessels, 1 and 2, swaged near their upper ends to a larger diameter and communicating near their bottom ends. The two vessels are of different horizontal cross section but substantially coextensive in elevation. Each vessel is provided with a separator 3, 4 for separating dust from the effluent gases. Each separator is provided with a dip leg 5, 6 which extends downwardly to a point below the normal level of the pseudo liquid bed, indicated by lines 7 and 8. Each vessel is also provided with means for injecting gas near the bottom. In vessel 1 this is a grid of perforated pipe 9 communicating with the gas inlet line 10. In vessel 2 a horizontal grid 11 is provided to distribute the gas introduced at the bottom of the vessel via line 12. Vessel 1 is provided with an inlet line 13 for the introduction of the contaminated contact material. This line is arranged to discharge the contaminated material at a point near the upper level of the pseudo liquid bed. Vessel 2 is provided with a line 14 for the withdrawal of the regenerated solid. This line is arranged to withdraw the solid as a pseudo liquid from a point near the upper level of the pseudo liquid bed. Vessels 1 and 2 are also interconnected by a series of inclined pipes 15 having their lower ends in vessel 2 at points below the level of the pseudo liquid bed and having their upper ends at higher points in vessel 1, also below the level of the pseudo liquid bed. A series of nozzles 16 are arranged to cooperate with the inclined tubes as will be explained. These nozzles are fed with gas from a manifold line 17 which enters through the bottom of the larger vessel.

In operation, the powdered contact material contaminated with carbonaceous deposits, but preferably stripped of most of the occluded carbonaceous material, enters the apparatus via line 13 in a substantially continuous stream. The finely divided solid flows downwardly and then laterally to a point near the bottom of vessel 2; it then flows upwardly through vessel 2 and is finally withdrawn through the discharge line 14.

An important feature of the method of the invention is that, aside from the desired flow in the roughly U shaped path, a substantial, although minor, portion of the finely divided solid is continuously injected from the second zone up through the inclined passages to the first zone. This flow is caused to take place and is regulated by the gas introduced via line 17 and nozzles 16. In order to obtain this flow it is essential that the passages be inclined, and in order that the full benefit of this invention may be realized it is necessary that a plurality of such pipes be provided.

In the described method as carried out in the apparatus illustrated in this figure, the contact material flows downwardly in the first cell in admixture with partially regenerated contact material injected through the inclined passages and countercurrent to the gas introduced via line 10 and that introduced via the inclined passages. The gas introduced via line 10 may be a relatively inert gas such as steam, flue gas, nitrogen, carbon dioxide or the like, or it may contain a small amount of oxygen insufficient to burn the carbonaceous deposits. The gas introduced via the inclined tubes may be the same or different than that introduced via line 10. Thus, for example, steam or carbon dioxide may be introduced via line 10 and air or oxygen may be introduced via lines 15. In the first zone, due to the countercurrent contact, the injection of the partially regenerated catalyst from the second zone, and the relatively inert nature of the gas used, the carbonaceous deposits in the solid are largely removed with little actual combustion. The temperature in this first zone is preferably maintained between 750° F. and 1000° F. This temperature may be maintained by heating means (not shown), or by preheating the incoming contact material, or by preheating the gas, or by regulating the oxygen content of the gas to afford a desired minor amount of combustion, or by any combination of these means, but part of the heat is supplied by the partially regenerated material injected as described. In the usual practice, the heat is supplied by a combination of these means, namely, by supplying the solid in a heated condition, using hot gases, applying a very limited combustion, and by the heat supplied by the injected solid. Even though the residence time of the solid in the first zone is short compared to that in the second zone, a substantial part of the carbonaceous deposits may be removed with little or no combustion. The gas leaving the first zone via line 18 is suitable as a fuel gas and in many cases it is also possible to recover product values from it by cooling and/or scrubbing with a suitable solvent. It is also possible, although wasteful, to combine the gases from this zone with the flue gas from the second zone.

In the second zone the partially regenerated solid passes upwardly concurrent with the gas introduced via line 12. This gas is usually air, but may be industrial oxygen or any other gas containing sufficient oxygen to burn the carbonaceous deposits to the desired extent. The temperature in the second zone is maintained higher than that in the first zone and is preferably in the range of 1000° F. to 1200° F. In some cases a small amount (e. g. 0.02 to 1%) of a volatile halogen compound, such as carbontetrachloride, phosgene, sulfur pentachloride, dichloropropane, hydrogen chloride, or the like, may be advantageously introduced with the gases via line 12. In some cases the presence of these or similar halogen compounds changes the combustion characteristics so that the production of carbon monoxide rather than carbon dioxide is favored. This results in a decreased liberation of heat and, therefore, allows a greater gas velocity and/or a higher concentration of oxygen to be used without exceeding the desired temperatures.

The apparatus illustrated in Figure II employs the same flow system and the same system of catalyst injection as that illustrated in Figure I described above. The main difference is in the construction of the apparatus. Whereas the apparatus of Figure I comprises two cylindrical vessels at approximately the same elevation spaced a small distance apart, that illustrated in Figure II contains both zones in a single cylindrical housing, the separate zones being formed by a vertical partition 21 which extends from the top of the vessel to a point near, but short of, the bottom. This construction has the further advantage that a larger number of inclined tubes 22 may be conveniently spaced in the partition to obtain a more uniform distribution of the injected solid in the first zone. Thus, in a typical case, from 6 to 30 or more such inclined tubes may be placed in the partition without difficulty due to crowding or expansion problems. While the apparatus illustrated in Figure II is no more efficient (considering an equal number of inclined tubes properly spaced) it is considerably simpler and less costly to build.

In the apparatus illustrated in Figure II a perforated coil 23 is provided to distribute the gases introduced into the second zone via line 24, rather than a grid such as illustrated in Figure I. It will be noted that in this structure the gas distributing devices are located near the bottom of the separate zones but at such a distance from the bottom that the gases remain separated by the depending partition.

As stated above, part of the required gas is utilized in the present process to inject solid from the second zone to the first zone through inclined passages. When both ends of the inclined passages (tubes) terminate below the levels of the fluidized beds as illustrated in Figures I and II, it is essential that the passages be inclined at an appreciable angle, e. g. about 45°, in order to obtain the desired flow. The gas may be directed up through the tubes by means of nozzles placed at their lower open ends, preferably inserted a few inches. Some difficulty may be incurred in starting the flow with such nozzles without using a very high gas velocity (pressure). In order to overcome this difficulty, centered, perforated pipe extending over a considerable part of the length of the tubes may be used instead of nozzles. Such an arrangement is illustrated in Figure V. The minor amount of gas injected by the few upper perforations 51 aids considerably in starting the flow. A preferred modification, however, uses a combination of the nozzle and the centered perforated pipe. Such a modification is illustrated in Figure IV. In this arrangement the main quantity of the gas introduced via line 41 passes into the tube 42 at the mouth via the nozzle 43. A minor portion of the gas passes up through the centered tube and is discharged via outlets 44 at higher points in the tube 42.

In the apparatus illustrated in Figures I and II, the upper ends of the inclined tubes discharge below the level of the fluidized bed in the first zone. The injection of powdered solid through a plurality of inclined tubes in this manner produces a quite uniform distribution of the injected solid in the contaminated solid passing down through the first zone. This is desirable. On the other hand, the control of the flow in this system is rather sensitive to fluctuations in the system and is somewhat difficult.

A system which is more easily controlled is illustrated in Figure VI. The apparatus in this case is the same as that illustrated in Figure II, except for the differences noted in the section shown. In this system the inclined tubes are extended in a vertical direction to discharge into the upper so-called disengaging space above the level of the fluidized bed. A baffle 61 is preferably provided to deflect the discharged solid in a downward direction. If such a baffle is not provided a considerable amount of the solid may escape from the apparatus with the gases withdrawn via line 62.

The claimed invention is:

1. An apparatus for the regeneration of contaminated powdered contact agents which comprises a vertical regenerator shell closed at the top and bottom, a depending partition member extending from the top to a point short of the bottom, outlets for gaseous fluid on each side of said partition member at the top, inlet for contaminated powder near the top on one side of said partition member, an outlet for regenerated powder near the top on the other side of said partition member, a plurality of inclined conduits extending through said partition member, a plurality of gas jets in cooperative relationship to the lower ends of said inclined conduits, and gas distributing means near the bottom on either side of said partition member.

2. Apparatus according to claim 1 further characterized in that said inclined conduits are extended at their upper ends in an upward direction with their discharge ends below a deflecting plate near the top on the intake side of said partition.

LAWSON E. BORDER.
RICHARD P. TRAINER.

REFERENCES CITED

The following references are of record in the file of this patent:

UNITED STATES PATENTS

| Number | Name | Date |
|---|---|---|
| 2,429,721 | Jahnig | Oct. 28, 1947 |
| 2,457,232 | Hengstebeck | Dec. 28, 1948 |
| 2,477,751 | Johnson | Aug. 2, 1949 |
| 2,526,881 | Kunreuther et al. | Oct. 24, 1950 |
| 2,571,380 | Penick | Oct. 16, 1951 |